(12) United States Patent
Arvold et al.

(10) Patent No.: US 11,537,490 B2
(45) Date of Patent: Dec. 27, 2022

(54) EVENT SEQUENCE ANALYSIS

(71) Applicant: Tableau Software, LLC, Seattle, WA (US)

(72) Inventors: Michael John Arvold, Seattle, WA (US); Ross Thomas Bunker, Seattle, WA (US); Daniel Philip Cory, Seattle, WA (US); Vivek Anup Maharajh, Kirkland, WA (US); Britta Claire Nielsen, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 215 days.

(21) Appl. No.: 16/942,729

(22) Filed: Jul. 29, 2020

(65) Prior Publication Data

US 2022/0035723 A1 Feb. 3, 2022

(51) Int. Cl.
*G06F 16/00* (2019.01)
*G06F 11/30* (2006.01)
*G06F 9/54* (2006.01)
*G06F 11/34* (2006.01)
*G06F 16/9038* (2019.01)
*G06F 16/9035* (2019.01)

(52) U.S. Cl.
CPC .......... *G06F 11/3075* (2013.01); *G06F 9/542* (2013.01); *G06F 11/3476* (2013.01); *G06F 16/9035* (2019.01); *G06F 16/9038* (2019.01)

(58) Field of Classification Search
CPC .. G06F 11/3075; G06F 9/542; G06F 11/3476; G06F 16/9035; G06F 16/9038
See application file for complete search history.

(56) References Cited

U.S. PATENT DOCUMENTS

| 11,016,824 | B1* | 5/2021 | Wells | G06F 11/3075 |
| 11,048,766 | B1* | 6/2021 | Chen | G06F 16/9014 |
| 2013/0198227 | A1* | 8/2013 | Fradkin | G06F 16/2477 707/769 |
| 2016/0232032 | A1* | 8/2016 | Azvine | G06F 9/4881 |

* cited by examiner

*Primary Examiner* — Jared M Bibbee
(74) *Attorney, Agent, or Firm* — John W. Branch; Branch Partners PLLC

(57) ABSTRACT

Embodiments are directed to managing event information. A plurality of events associated with entities may be provided. A plurality of state types may be determined based on the plurality of events such that each state type is associated with a state. State keys associated with each entity may be determined based on events associated with each entity and the state types. A state stream for each entity may be provided based on their state keys such that each state stream may be an ordered sequence of the keys associated with each entity. In response to a query that includes a pattern filter, the pattern filter may be employed to determine a portion of the entities based on the state stream for each entity such that the pattern filter matches the state stream for each of the portion of the entities.

20 Claims, 9 Drawing Sheets

EVENT SEQUENCE ANALYSIS

TECHNICAL FIELD

The present invention relates generally to data analysis, and more particularly, but not exclusively to, event sequence analysis.

BACKGROUND

Organizations are generating and collecting an ever increasing amount of data. This data may be associated with disparate parts of the organization, such as, consumer activity, manufacturing activity, customer service, server logs, or the like. Further, in many cases, the data represents a change in state associated with a given activity. In some cases, modern data processing systems may enable organizations to view the current state of a system. However, often information associated with a sequence of actions or events that result in a current state may be difficult to discern using conventional data processing systems. Even if detailed logs or event histories may be maintained or collected, the construction or execution of queries, or the like, that provide actionable insights may be limited because of various factors, including, the amount of data, the intermingling of data, the lack of structure, or the like. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
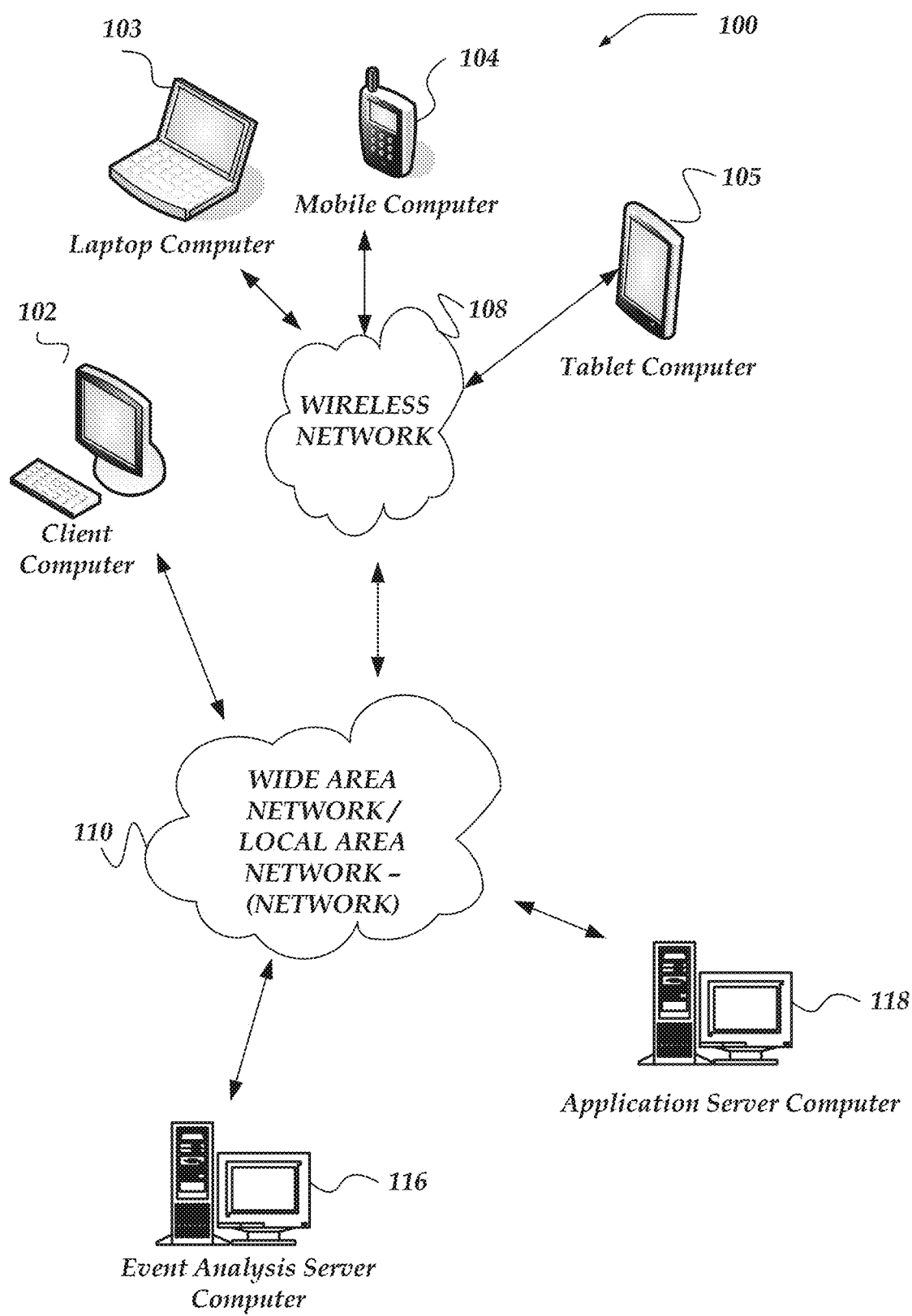
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing event information using one or more processors that execute one or more instructions to perform as described herein.

In one or more of the various embodiments, a plurality of events that are associated with one or more entities may be provided.

In one or more of the various embodiments, a plurality of state types may be determined based on the plurality of events such that each state type is associated with a state key and such that each state key may be distinct from other state keys. In some embodiments, determining the state types may include, determining one or more fields in the plurality of events that may be associated with one or more state transitions associated with the one or more entities that may be associated with the plurality of events.

In one or more of the various embodiments, one or more state keys that are associated with each entity may be determined based on one or more events associated with each entity and the one or more state types.

In one or more of the various embodiments, a state stream for each entity may be provided based on their one or more state keys such that each state stream may be an ordered sequence of the one or more state keys that may be associated with each entity.

In one or more of the various embodiments, in response to a query that includes a pattern filter, further actions may be performed, including: employing the pattern filter to determine a portion of the one or more entities based on the state stream for each entity such that the pattern filter matches the state stream for each of the portion of the entities; generating a query result based on the query and the portion of the one or more entities; or the like. In some embodiments, the pattern filter may include a regular expression that may be arranged to match one or more sequences of state keys.

In one or more of the various embodiments, determining the portion of the one or more entities may include: comparing each sequence of state keys to the pattern filter; determining one or more state streams based on an affirmative result of the comparison; employing the one or more determined state streams to determine each entity that corresponds to the one or more determined state streams; or the like.

In one or more of the various embodiments, the one or more state keys that are associated with each entity may be concatenated into one or more sequences of states.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, event analysis server computer 116, application server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, event analysis server computer 116, application server computer 118, or other computers.

Client computers 102-105 may further be configured to include a client application that enables an end-user to log into an end-user account that may be managed by another computer, such as event analysis server computer 116, application server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by event analysis server computer 116, application server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, event analysis server computer 116, application server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of event analysis server computer 116 is described in more detail below in conjunction with FIG. 3. Although FIG. 1 illustrates event analysis server computer 116 or the like, as a single computer, the innovations or embodiments are not so limited. For example, one or more functions of event analysis server computer 116, or the like, may be distributed across one or more distinct network computers. Moreover, in one or more embodiments, event analysis server computer 116 may be implemented using a plurality of network computers. Further, in one or more of the various embodiments, event analysis server computer 116, or the like, may be implemented using one or more cloud instances in one or more cloud networks.

Accordingly, these innovations and embodiments are not to be construed as being limited to a single environment, and other configurations, and other architectures are also envisaged.

Illustrative Client Computer

Figure 2:
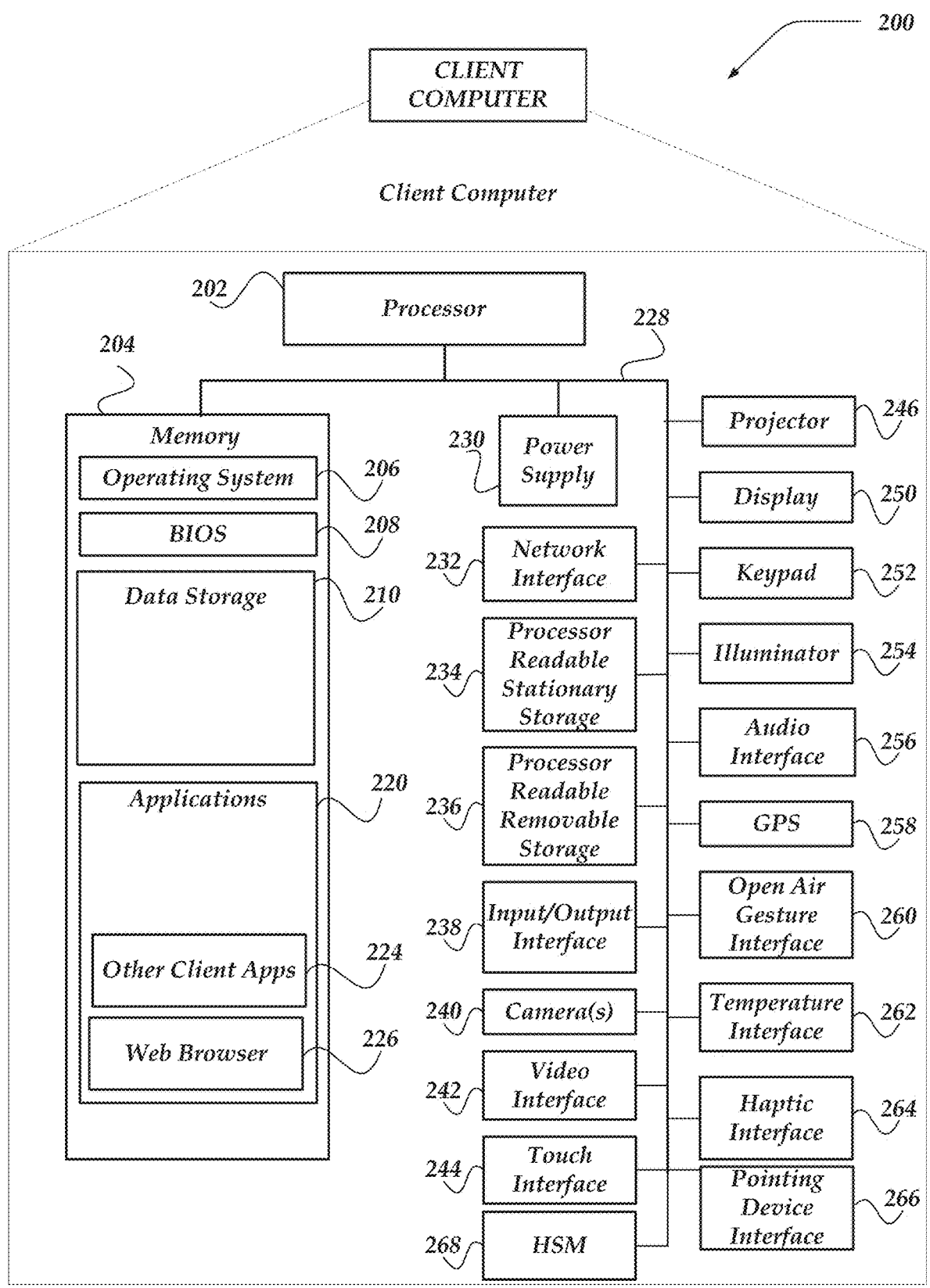
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
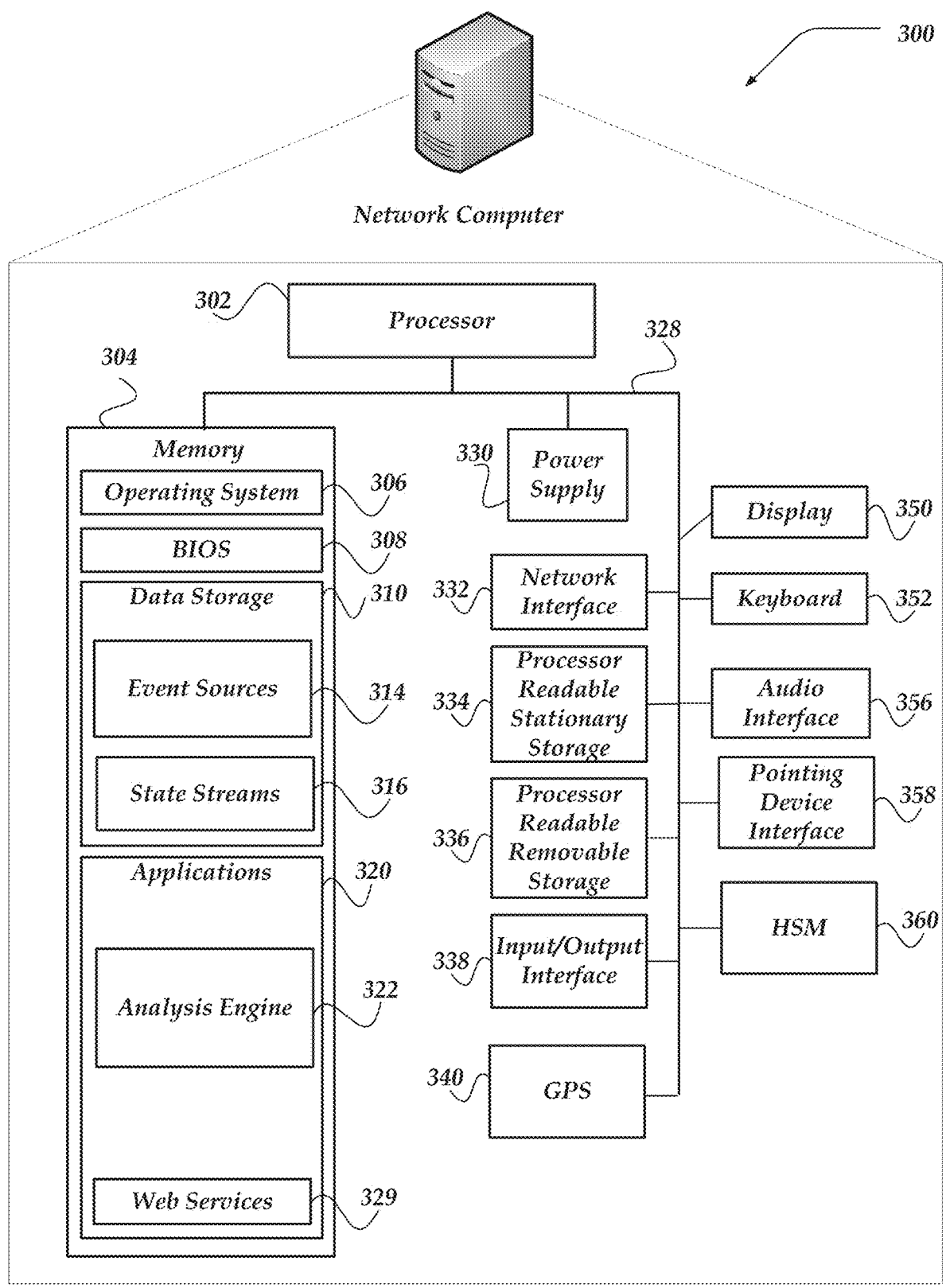
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of event analysis server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like. Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, event analysis engine 322, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, event sources 314, state streams 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include event analysis engine 322, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, analysis engine 322, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to event analysis engine 322, other applications 329, or the like, may be provisioned and de-commissioned automatically.

Also, in one or more of the various embodiments, event analysis engine 322, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
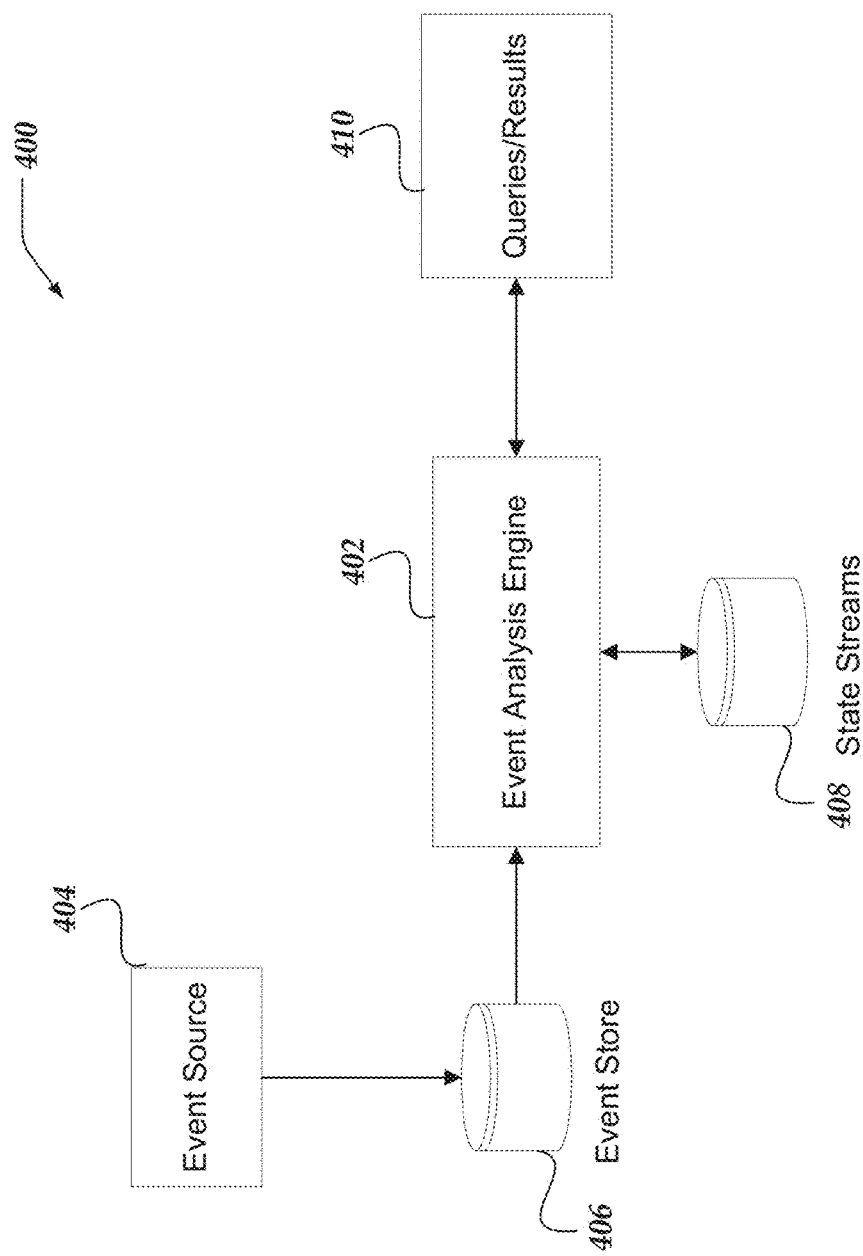
FIG. 4 illustrates a logical architecture of a system for event sequence analysis in accordance with one or more of the various embodiments.

FIG. 4 illustrates a logical architecture of system 400 for event sequence analysis in accordance with one or more of the various embodiments. In one or more of the various embodiments, system 400 may be an event analysis platform arranged to include various components including: event analysis engine 402; one or more event sources, such as, event source 404; one or more event data stores, such as, as event store 406, one or more state stream stores, such as, state streams 408; or the like. In one or more of the various embodiments, event analysis engines may be arranged to receive one or more queries or generate one or more query results, such as, queries/results 410, or the like.

In one or more of the various embodiments, event source 404 represents applications, services, or the like, that produce event information. In some embodiments, event information may be a collection of events generated by one or more application or services. Also, in one or more of the various embodiments, event sources may be applications, services, or systems that produce log files, or the like.

In one or more of the various embodiments, events may be associated with state transitions for various systems. In some embodiments, an individual event may correspond to a state transition. Also, in some embodiments, an individual state transition may be associated with two or more events. Likewise, in some embodiments, one or more different events may be associated with the same state transition. In one or more of the various embodiments, events or event information may be stored in data stores, such as, databases, file systems, or the like.

In one or more of the various embodiments, events may be ingested or stored by event store 406 in real-time or near real-time. Likewise, in some embodiments, events may be generated or collected prior to making them available to event analysis engine 402.

In one or more of the various embodiments, events may be associated with one or more entities, one or more states or state transitions, time values or timestamps, or the like.

In one or more of the various embodiments, event analysis engine 402 may be arranged to process event information from event store 406 to generate state streams that are associated with entities based on the state transitions included in the events. In one or more of the various embodiments, state streams may be generated in advance and stored in a data store, such as, state streams 408. Also, in some embodiments, analysis engines may be arranged to generate state streams on-the-fly.

Accordingly, in one or more of the various embodiments, client computers, other applications, services, or the like, may provide queries to event analysis engine 402 represented here by queries/results 410. In some embodiments, query information may include pattern filters that event analysis engines may employ to generate query results.

In one or more of the various embodiments, event analysis engines may be arranged to employ pattern filters to determine one or more entities based on a match of the pattern filter with the state streams. Accordingly, in some embodiments, if a pattern filter matches a state stream, the one or more entities associated with that state stream may be determined from the matched state stream data structures.

In one or more of the various embodiments, a query may be arranged to generate results that may be based on the state streams that may be matched. For example, a query that is seeking a count of state streams that match pattern filter may be answered directly from the count of matched state streams. Alternatively, in some embodiments, pattern filters may be employed to determine a set of entities before applying other query actions to those entities.

Figure 5:
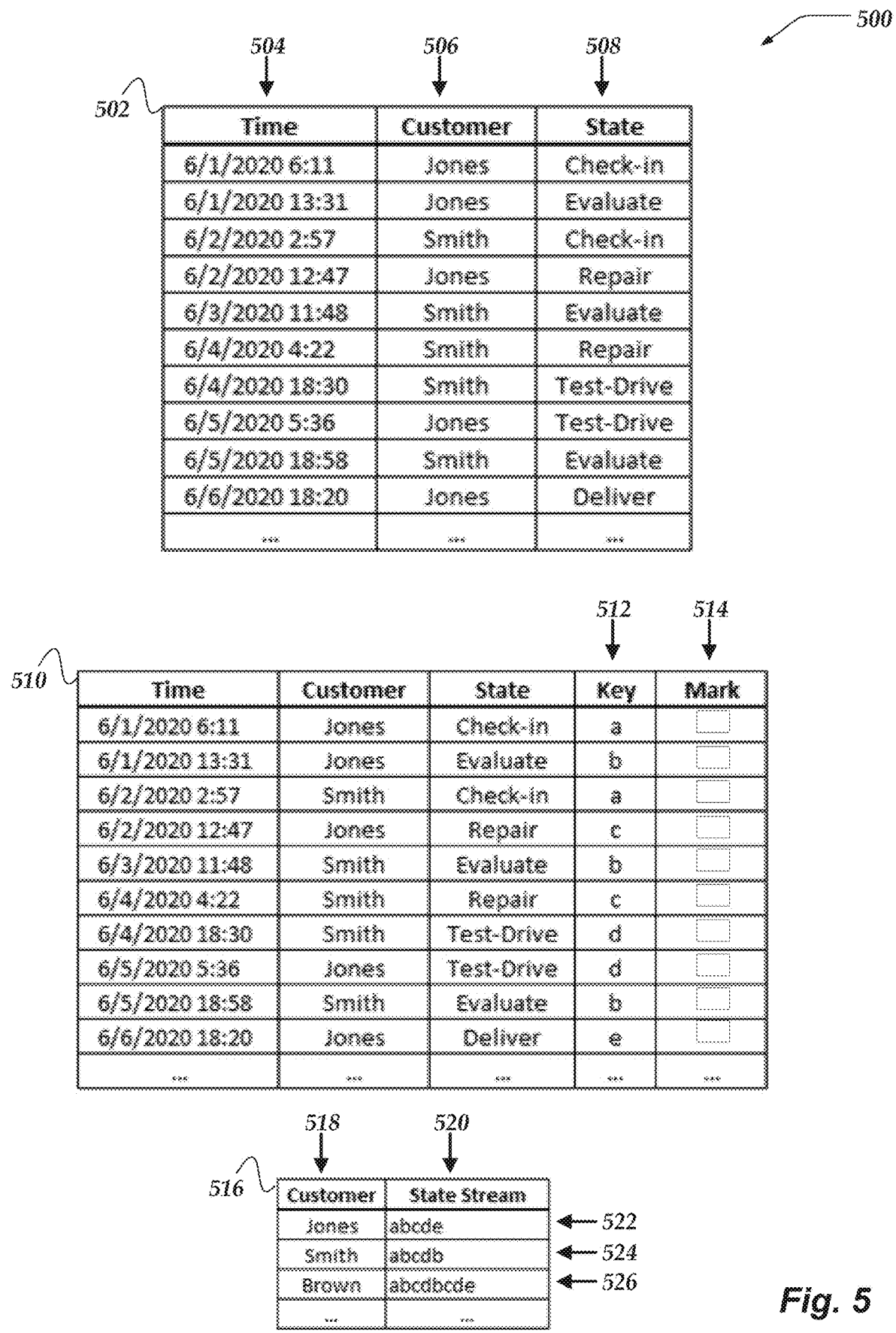
FIG. 5 illustrates a logical schematic of data structures for event sequence analysis in accordance with one or more of the various embodiments.

FIG. 5 illustrates a logical schematic of data structures 500 for event sequence analysis in accordance with one or more of the various embodiments. In one or more of the various embodiments, events 502 represents a collection of events as they may be presented or stored in an event store. In this example, each record in events 502 represents an event. Accordingly, in this example, the columns of events 502 represent at least a portion of the fields or attributes of an event. In this example, column 504 represents a time or timestamp field that stores a time value associated with each event. In some embodiments, column 506 represents an entity field that may be associated with each event, in this example, column 506 represents a customer identifier that may be associated with each event. And, in this example, column 508 represent a state field that stores state or state transition information that may be associated with each event.

In one or more of the various embodiments, keyed events 510 represents a data structure for storing events that are keyed to a state key. In some embodiments, state keys may be distinct values that correspond to a state or state type. Accordingly, in some embodiments, each state or state transition (hereinafter referred to as states) may be associated with a key value that may be unique with respect to other states in the same system or scope. In this example, there are five states, including: Check-in, Evaluate, Repair, Test-Drive, and Deliver. Accordingly, in this example, the state/key pairings may be (Check-in, a), (Evaluate, b), (Repair, c), (Test-Drive, d), and (Deliver, e).

In one or more of the various embodiments, event analysis engines may be arranged to use a variety of different formats or values for state keys as long as they may be distinct for the set of the states that are of interest. In some embodiments, state keys may be characters or strings that may be evaluated using regular expressions, or the like.

In one or more of the various embodiments, event analysis engines may be arranged to generate state streams for each entity by combining or concatenating the state keys associated with a given entity. In this example, state streams 516 represents a collection of state streams that are based on events 502 or keyed events 510. In this example, each record in state streams 516 includes at least an entity identifier and a state stream comprised of the concatenated state keys for an entity. In some embodiments, each state stream may be arranged such that the state keys are ordered based on the order of their occurrence relative to each entity.

In this example, for some embodiments, entities, such as, Jones, Smith, and Brown, may be considered to represent customers of an automobile service organization. In this example, customers may drop off their vehicles for repair and retrieve them if they are ready for delivery. Accordingly, in this example, a state stream that represents states in the sequence: Check-In, Evaluate, Repair, Test-Drive, and Deliver may be considered to represent an ideal workflow. In contrast, for example, a state stream that includes this sequence: Check-In, Evaluate, Repair, Test-Drive, Evaluate, Repair, Test-Drive, Deliver may be considered less than ideal because the first repair was not sufficient to pass a test-drive.

Accordingly, in this example, event analysis engines may be arranged to identify cases where the workflow for repairing a vehicle is less than ideal. For example, if an organization wants to compare the costs/revenue for the different customers, a first comparison may show customer Smith (e.g., record 524) or customer Brown (e.g., record 526) may have higher cost or revenue than customer Jones (e.g., record 522). However, in this example, customer Jones' repair workflow went through less states than customer Brown and also in this example, customer Smith's vehicle is not ready for delivery. So comparing cost/revenue, or the like, of these three customers with each other may not provide meaningful comparisons. However, if an event analysis engine employed a pattern filter to identify all the customers that have reached the Delivery state, subsequent analysis that compared costs/revenue may be considered more relevant. Likewise, comparing costs/revenue of customers that went through the ideal workflow (e.g., customers like Jones) may enable the organization to determine average costs/revenues for customers that are handled most efficiently. Accordingly, in some embodiments, event analysis engines that employ state streams may improve analysis results by efficiently incorporating state sequences to include or exclude entities from subsequent analysis.

Figure 6:
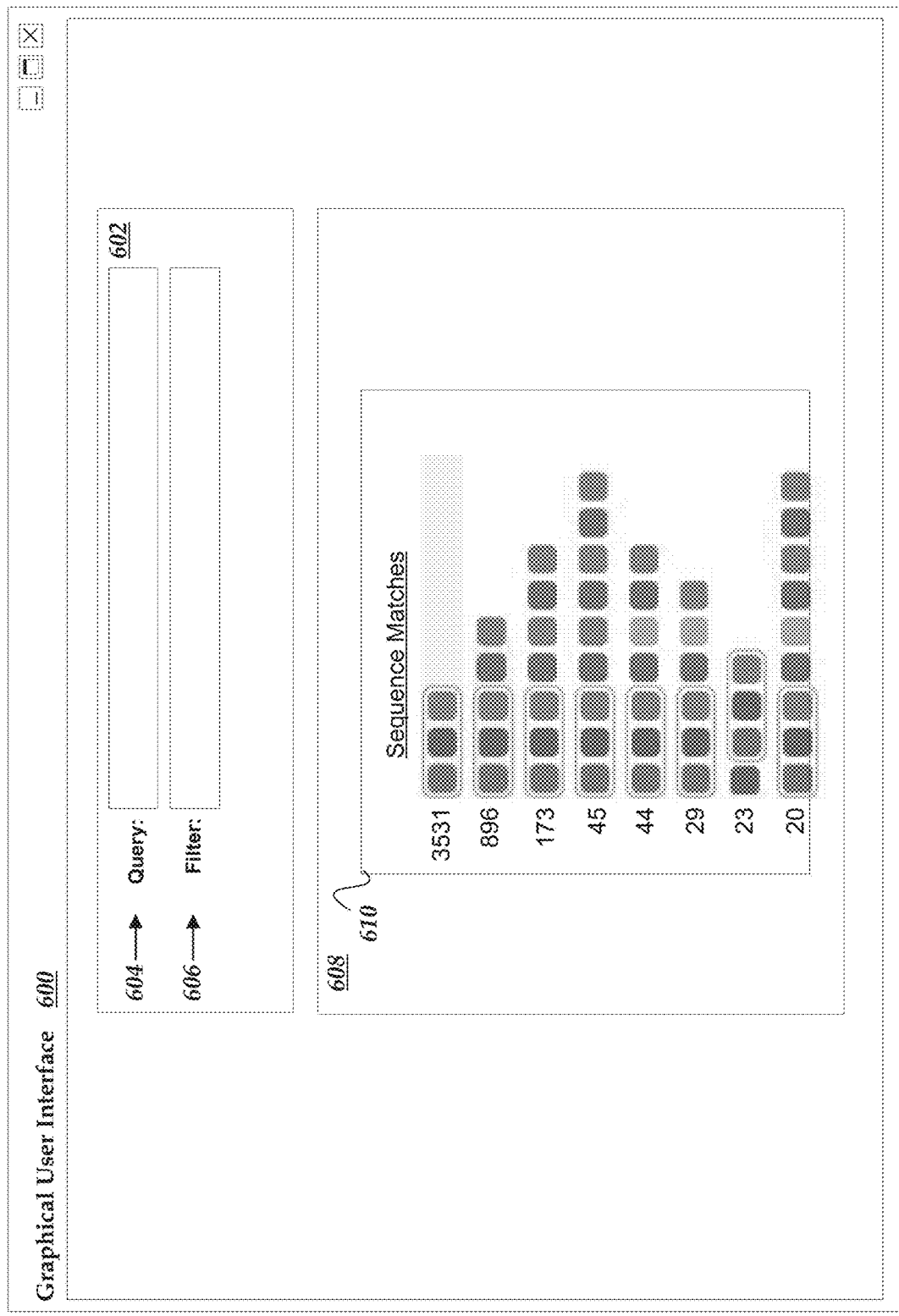
FIG. 6 illustrates a logical representation of a portion of a user interface for event sequence analysis in accordance with one or more of the various embodiments.

FIG. 6 illustrates a logical representation of a portion of user interface 600 for event sequence analysis in accordance with one or more of the various embodiments. In some embodiments, user interface 500 may be arranged to include one or more panels, such as, query panel 602, display panel 608, or the like.

In one or more of the various embodiments, user interface 600 may be displayed on one or more hardware displays, such as, client computer displays, mobile device displays, or the like. In some embodiments, user interface 600 may be provided via a native application or as a web application hosted in a web browser or other similar applications. One of ordinary skill in the art will appreciate that for at least clarity or brevity many details common to commercial/production user interfaces have been omitted from user interface 600. Likewise, in some embodiments, user interfaces may be arranged differently than shown depending on local circumstances or local requirements. However, one of ordinary skill in the art will appreciate that the disclosure/description of user interface 600 is at least sufficient for disclosing the innovations included herein.

In this example, query panel 602 is employed to enable users to enter query information. In some embodiments, field 604 may be arranged to enable users to provide queries directed towards events. Also, in some embodiments, field 606 may be arranged to enable users to provide pattern filters. In some embodiments, queries or pattern filters may be combined into a single expression or single field. Likewise, in some embodiments, additional fields may be provided to enable users to select event sources, format results, or the like.

In one or more of the various embodiments, pattern filters may be rules or instructions that may be arranged to match sequences of states in state streams. In some embodiments, pattern filters may be defined using rules or instructions that enable sequences of state keys to be matched. For example, in one or more of the various embodiments, pattern filters may be comprised of regular expressions arranged to match sequences of states that match particular patterns. For example, a perl5 compatible regular expression such as /.?abc./ may be employed to match each state stream that includes sequence of states that include abc. Likewise, for example, a regular expression such as /^a.c/ may match each state stream the begins with state a followed by any state followed by state c such as abc, axc, acc, or the like. One of ordinary skill in the art will appreciate that there may be a variety of regular expression languages using different notation. Accordingly, in one or more of the various embodiments, event analysis engines may be arranged to employ various regular expression engines or libraries. In some embodiments, event analysis engines may be arranged to determine which regular expression dialects may be supported based on rules, instructions, configuration settings, or the like, provided via configuration information to account for local requirements or local conventions. Further, in some embodiments, user interface 600 may be arranged to employ user interface elements that hide the underlying matching rules (regular expressions, or otherwise) from users. For example, user interfaces may be arranged to provide picker or selection controls that enable users to define state sequence patterns without directly using regular expressions or other sequence pattern matching instructions.

In this example, display panel 608 is employed to display one or more portions of a visualization of the results of queries or pattern filters generated from events or state streams In this example, display panel 608 includes visualization 610 that show query results. In this example, visualization 610 represents a histogram based on the number of state streams that matched a query or pattern filter. In this example, 3531 state streams include just the three states, 896 state streams start with the three states with two states following the first three, and so on. In practice the particular results may depend the state streams and the pattern filter.

Further, in one or more of the various embodiments, query information may include formatting or layout information. Also, in some embodiments, query information may be arranged such that pattern filters may be applied before or after a query defined using a general purpose query language be applied. For example, rather than generating a histogram of state streams that may match a sequence, a query result may be a line plot of values that include or exclude items included in the line plot based on whether their associated state streams were matched by a pattern filter. For example, query results may be a visualization of the revenue generated by customers that are associated with a particular sequence of states. Thus, in some embodiments, conventional queries may be applied to a set of data that has been selected of filtered based on their state streams and a pattern filter.

Generalized Operations

Figure 7:
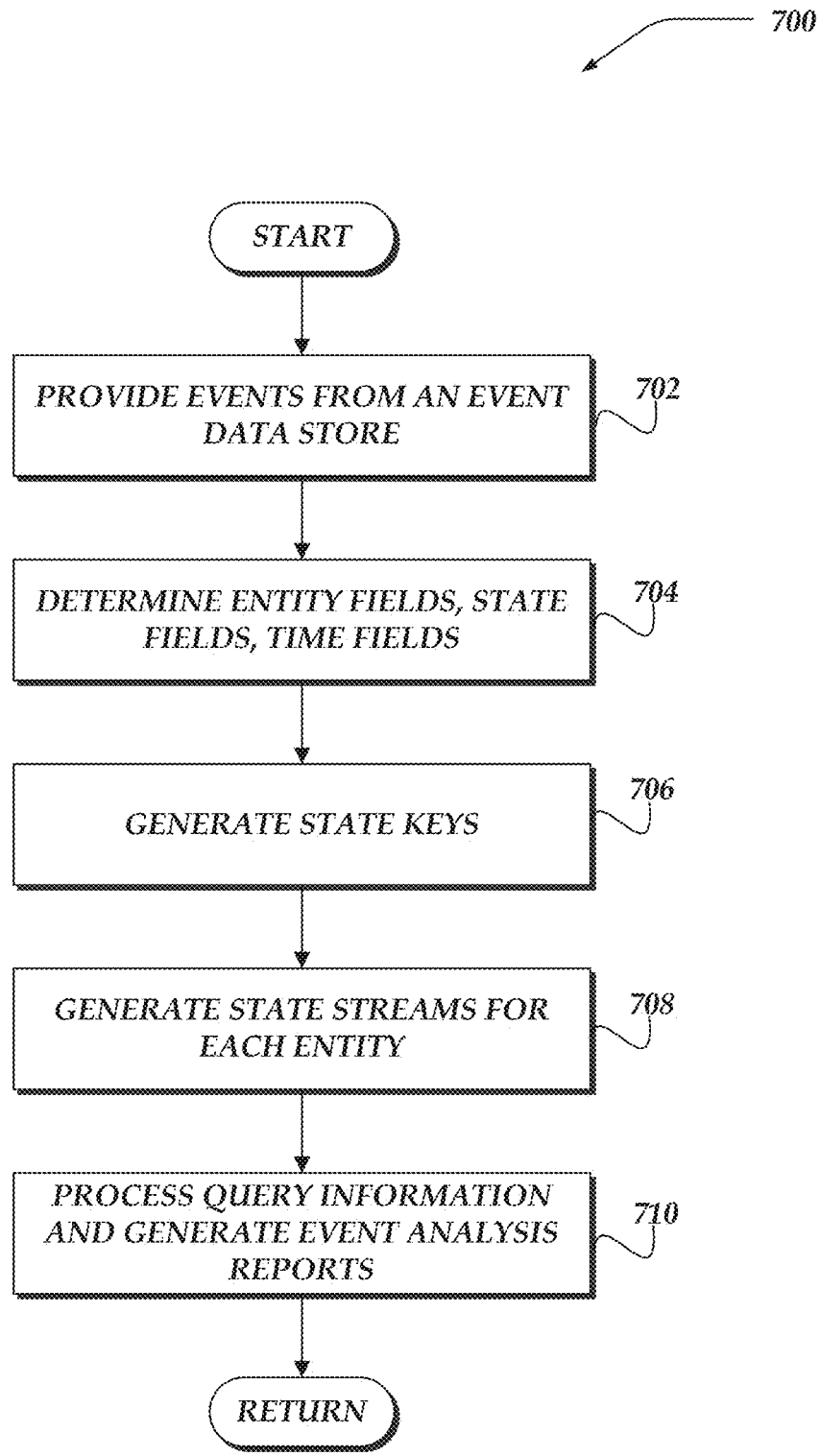
FIG. 7 illustrates an overview flowchart of a process for event sequence analysis in accordance with one or more of the various embodiments.
Figure 8:
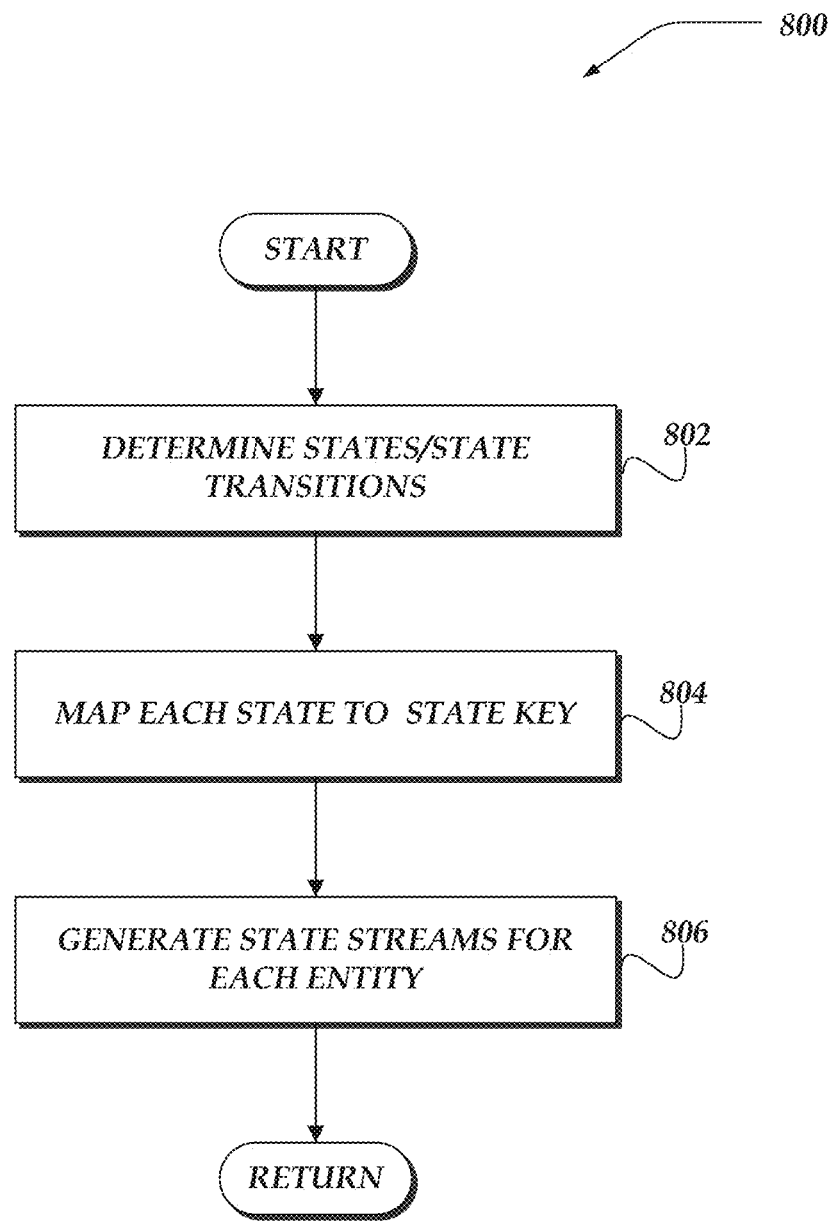
FIG. 8 illustrates a flowchart of a process for event sequence analysis in accordance with one or more of the various embodiments.
Figure 9:
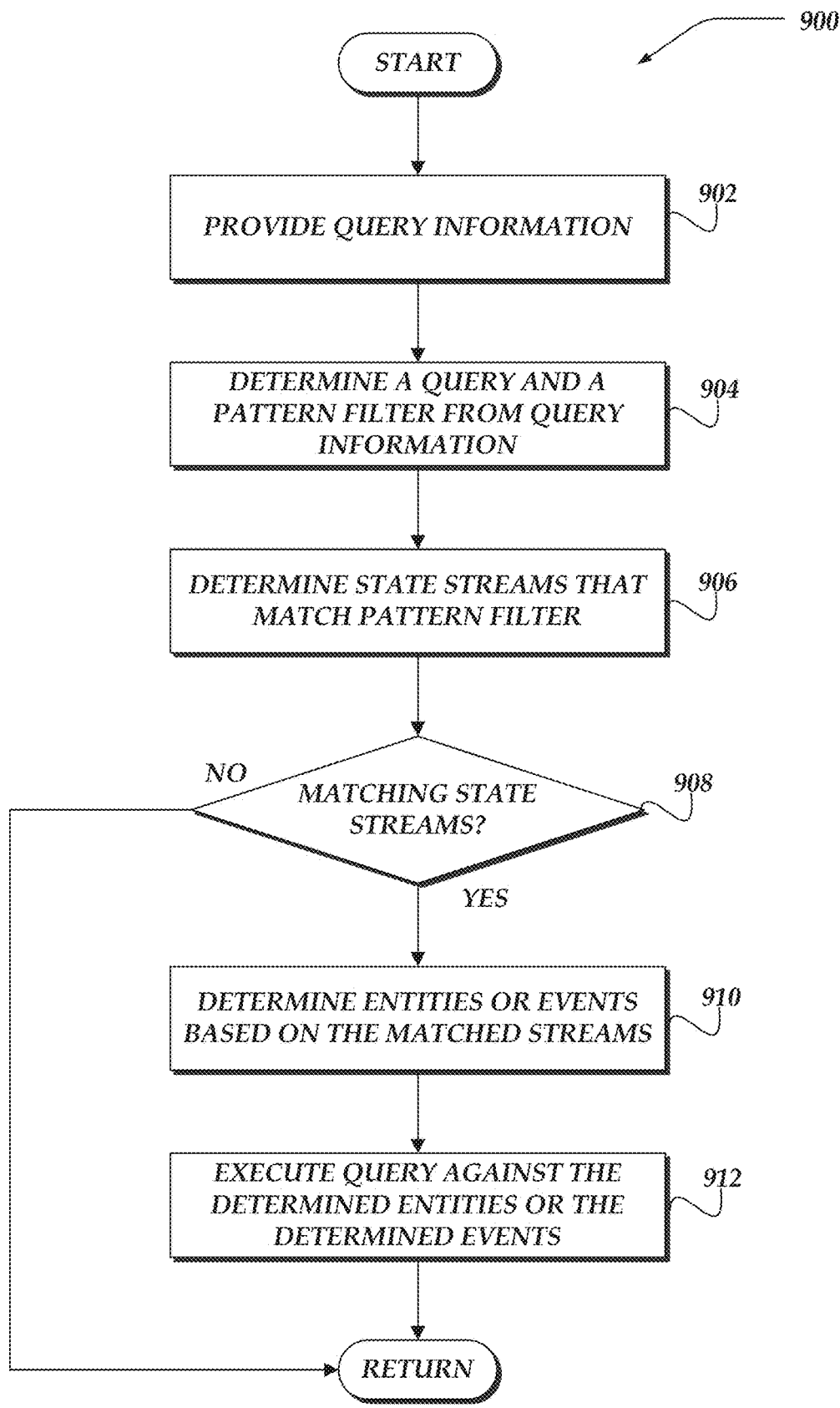
FIG. 9 illustrates a flowchart of a process for event sequence analysis in accordance with one or more of the various embodiments.

FIGS. 7-9 represent generalized operations for event sequence analysis in accordance with one or more of the various embodiments. In one or more of the various embodiments, processes 700, 800, and 900 described in conjunction with FIGS. 7-9 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-9 may be used for event sequence analysis in accordance with at least one of the various embodiments or architectures such as those described in conjunction with FIGS. 4-6. Further, in one or more of the various embodiments, some or all of the actions performed by processes 700, 800, and 900 may be executed in part by event analysis engine 322 running on one or more processors of one or more network computers.

FIG. 7 illustrates an overview flowchart of process 700 for event sequence analysis in accordance with one or more of the various embodiments. After a start block, at start block 702, in one or more of the various embodiments, event analysis engines may be arranged to provide one or more events from an event data store. As described above, event data stores may be file systems, databases, or the like, where event information may be stored. In some embodiments, event information may include explicit events that may be generated by a dedicated event system, such as, an anomaly detection system, network monitoring system, or the like. Also, in some embodiments, events may be information entries that record workflow steps, operation actions, user activity, or the like, rather than being limited to entries that may be designated expressly as events.

In one or more of the various embodiments, event information may include information that the event analysis engine may interpret as discrete actions, some of which may include state information or state transition information.

At block 704, in one or more of the various embodiments, event analysis engines may be arranged to determine entity fields, state fields, time fields, or the like, from the events. In some embodiments, event information may include one or more fields or attributes. In some embodiments, one or more fields may correspond to an entity that an event may primarily be associated with. In some embodiments, event information may be associated with two or more entities.

Likewise, in one or more of the various embodiments, the event information may include one or more field or attributes that may correspond to states or state transitions that may be associated with the event.

Accordingly, in one or more of the various embodiments, event analysis engines may be arranged to determine the one or more fields in the event information that may be associated with or may identify the entities of interest. In some embodiments, if two or more entities are included in an event records, event analysis engines may be arranged to identify some or all of the entities.

Similarly, in one or more of the various embodiments, event analysis engines may be arranged to determine the fields or attributes in the event information that may correspond to states or state transitions.

Further, in some embodiments, some event information may be associated with timestamps, or the like. Accordingly, in some embodiments, event analysis engines may be arranged to determine the time fields from the event information.

In one or more of the various embodiments, event analysis engines may be arranged to employ various parsers, grammar, rules, or the like, to determine the entities, states, or the like, that may be included in the event information. Accordingly, in one or more of the various embodiments, event analysis engines may be arranged to employ parsers, grammar, rules, or the like, provided via configuration information to determine the entities, states, or time information from the event information.

At block 706, in one or more of the various embodiments, event analysis engines may be arranged to generate state keys that correspond to each state transition. As described above, each unique state may be mapped to a state key. See also, FIG. 8 and its description for more detail.

At block 708, in one or more of the various embodiments, event analysis engines may be arranged to generate state streams for each entity. As described above, state streams may be generated by determining the states for an entity from the event information and storing them in a sequence that matches the order they occurred in the event information. For example, the first state in a state stream for an entity may be associated with the first state transition that occurred for a given entity.

At block 710, in one or more of the various embodiments, event analysis engines may be arranged to process query information and generate event analysis reports. In one or more of the various embodiments, event analysis engines may be arranged to provide user interfaces that enable users to provide query information that may include pattern filters directed towards the state streams. In some embodiments, event analysis engines may be arranged to employ the pattern filters to determine the state streams that may match the provided pattern filters. In some embodiments, state streams that match a pattern filter may be included in a result set. In some embodiments, query information may include a query that may be directed to the entities or events that may correspond to the state streams that matched the pattern filters.

Next, in one or more of the various embodiments, control may be returned to a calling process.

FIG. 8 illustrates a flowchart of process 800 for event sequence analysis in accordance with one or more of the various embodiments. After a start block, at start block 802, in one or more of the various embodiments, event analysis engines may be arranged to determine the states or state transitions that may be included in one or more events. In one or more of the various embodiments, event sources may be files, streams, databases, or the like. Accordingly, in some embodiments, events may be provided in a variety of formats. In one or more of the various embodiments, in some formats (e.g., databases) the states or state transition may be associated with a particular field or column that enables them to be easily or correctly identified. For example, if events are provided by a database table that includes a column that includes the state value, event analysis engines may determine the states with a query to that database.

In one or more of the various embodiments, schemas, type definitions (e.g., DTDs for XML, documents, or the like), type maps, indexes, catalogs, data dictionaries, or the like, may be provided for a given event source. Further, in some embodiments, event analysis engines may be arranged to provide user interfaces that enable users to identify the criteria for identifying the states.

At block 804, in one or more of the various embodiments, event analysis engines may be arranged to map each state to a state key. As described above, in some embodiments, each state type may be mapped to a state key. In some embodiments, the state keys may be generated such that they are unique within the scope or context of a given event collection. Also, in some embodiments, state keys may be generated such that they conform to the pattern matching engines that execute the pattern filters. Accordingly, in some embodiments, event analysis engines may be arranged to employ rules, grammars, parsers, maps, or the like, provided via configuration information to determine the particular actions that may be executed to map states to state keys.

At block 806, in one or more of the various embodiments, event analysis engines may be arranged to generate state streams for each entity discovered in the events. As described above, state streams are based on the sequence of states or state transitions that may be associated with an entity. In the example, described for FIG. 5 and FIG. 6, the entities would be the Customers. Accordingly, in those examples, a state stream may be generated for each Customer. In other embodiments, entities may include, computers, applications, web sites, web pages, patients, vehicles, or the like. Generally, in some embodiments, entities may be anything that is going through the state transitions.

Next, in one or more of the various embodiments, control may be returned to a calling process.

FIG. 9 illustrates a flowchart of process 900 for event sequence analysis in accordance with one or more of the various embodiments. After a start block, at start block 902, in one or more of the various embodiments, event analysis engines may be arranged to provide query information. As described above, in some embodiments, users or other services may be enabled to provide query information that may be employed for event analysis. In some embodiments, query information may be provided via a user interface or configuration information. In some embodiments, event analysis engines may be arranged to employ various rules, grammars, parsers, or the like, provided via configuration information to collect or interpret the query information.

At block 904, in one or more of the various embodiments, event analysis engines may be arranged to determine a query and a pattern filter from the query information. In one or more of the various embodiments, pattern filters may be provided separately from other query information or it may be provided together with a query. In this context, pattern filters include instructions or rules for matching state streams while the query may be considered to include other query information. In some embodiments, the query may be one or more expressions that may be compatible with a data source or event stores that define additional query criteria besides the pattern filters. For example, in some embodiments, the query may be SQL-like instructions, or the like.

At block 906, in one or more of the various embodiments, event analysis engines may be arranged to determine one or more state streams that match the pattern filter. In one or more of the various embodiments, the event analysis engines may be arranged to apply the pattern filters to the state streams to determine if there may be one or more matching state sequences in the state streams. In one or more of the various embodiments, event analysis engines may be arranged to support more than one pattern matching scheme. In some embodiments, pattern filters may be comprised of regular expressions compatible with one or more regular expression engines or libraries, such as, perl compatible regular expressions (PCRE), Javascript compatible regular expressions, python compatible regular expressions, custom regular expressions, or the like. Accordingly, in some embodiments, event analysis engines may be arranged to determine (or be provided) which regular expression to use based on configuration information.

In one or more of the various embodiments, event analysis engines may be arranged to employ other pattern matching engines that may not be regular expression engines. In some embodiments, pattern matching engines (including regular expression engines) may be provided as plug-ins or dynamically linked shared libraries. Further, in some embodiments, event analysis engines may be arranged to employ pattern matching engines that are provided by third parties or external services (including remote micro-services).

In one or more of the various embodiments, state keys or state streams may be modified in advance or on-the-fly to conform to requirements of the pattern matching engine being employed.

In one or more of the various embodiments, event analysis engines may be arranged to generate a list of state streams that matched the pattern filter. In some embodiments, the generated list may include references (e.g., identifiers) to the entities, state streams, or the like, rather than copies of the state streams, or the like.

At decision block 908, in one or more of the various embodiments, if one or more matching state streams may be determined, control may flow to block 910; otherwise, control may flow block 912. In some embodiments, event analysis engines may be arranged to employ pattern filters to identify state streams that include particular state sequences. In some cases, there may not be matching state streams. If there may not be matching sequences in the state streams, the result set may be empty. And, the query may be considered resolved.

At block 910, in one or more of the various embodiments, event analysis engines may be arranged to determine one or more entities or events based on the match state streams. In one or more of the various embodiments, each matching state stream may be associated with an entity or one or more events. Accordingly, in some embodiments, these entities or events may be determined from the state streams that matched the pattern filter.

At block 912, in one or more of the various embodiments, event analysis engines may be arranged to execute the query against the determined entities or the determined events. In one or more of the various embodiments, entities or events associated with the matching state streams may be associated with a variety of other fields or attributes. Accordingly, in some embodiments, the query may include expressions that are directed to these other fields or attributes. In some embodiments, the query may be configured to provide a query result directly from the state streams, such as, a count of matching state streams, or the like. In such cases, the other entity attributes or fields may not be considered.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing event information over a network using one or more network computers that include one or more processors to execute instructions that enable performance of actions, comprising:
    providing a plurality of events that are associated with one or more entities;
    determining a plurality of state types based on the plurality of events, wherein each state type is associated with a state key, and wherein each state key is distinct from other state keys;
    determining one or more state keys that are associated with each entity based on one or more events associated with each entity and the one or more state types;
    providing a state stream for each entity based on their one or more state keys, wherein each state stream is an ordered sequence of the one or more state keys that are associated with each entity; and
    in response to query information that includes one or more pattern filters, one or more queries and other information, performing further actions, including:
        employing the one or more pattern filters to determine a portion of the one or more entities based on the state stream for each entity, wherein the one or more pattern filters match the state stream for each of the portion of the entities; and
        generating one or more query results based on execution of the one or more queries on the portion of the one or more entities; and
        employing the other information to provide a format and a layout for a visualization based on the one or more query results for the portion of the entities.

2. The method of claim 1, further comprising:
    concatenating the one or more state keys that are associated with each entity into one or more sequences of states.

3. The method of claim 1, wherein the pattern filter, further comprises, a regular expression that is arranged to match one or more sequences of state keys.

4. The method of claim 1, wherein determining the state types, further comprises:

determining one or more fields in the plurality of events that are associated with one or more state transitions associated with the one or more entities that are associated with the plurality of events.

5. The method of claim 1, wherein determining a portion of the one or more entities based on the state stream for each entity, further comprises:
comparing each sequence of state keys to the pattern filter;
determining one or more state streams based on an affirmative result of the comparison; and
employing the one or more determined state streams to determine each entity that corresponds to the one or more determined state streams.

6. A processor readable non-transitory storage media that includes instructions for managing event information, wherein execution of the instructions by one or more processors enable performance of actions, comprising:
providing a plurality of events that are associated with one or more entities;
determining a plurality of state types based on the plurality of events, wherein each state type is associated with a state key, and wherein each state key is distinct from other state keys;
determining one or more state keys that are associated with each entity based on one or more events associated with each entity and the one or more state types;
providing a state stream for each entity based on their one or more state keys, wherein each state stream is an ordered sequence of the one or more state keys that are associated with each entity; and
in response to query information that includes one or more pattern filters, one or more queries and other information, performing further actions, including:
employing the one or more pattern filters to determine a portion of the one or more entities based on the state stream for each entity, wherein the one or more pattern filters match the state stream for each of the portion of the entities; and
generating one or more query results based on execution of the one or more queries on the portion of the one or more entities; and
employing the other information to provide a format and a layout for a visualization based on the one or more query results for the portion of the entities.

7. The media of claim 6, further comprising:
concatenating the one or more state keys that are associated with each entity into one or more sequences of states.

8. The media of claim 6, wherein the pattern filter, further comprises, a regular expression that is arranged to match one or more sequences of state keys.

9. The media of claim 6, wherein determining the state types, further comprises:
determining one or more fields in the plurality of events that are associated with one or more state transitions associated with the one or more entities that are associated with the plurality of events.

10. The media of claim 6, wherein determining a portion of the one or more entities based on the state stream for each entity, further comprises:
comparing each sequence of state keys to the pattern filter;
determining one or more state streams based on an affirmative result of the comparison; and
employing the one or more determined state streams to determine each entity that corresponds to the one or more determined state streams.

11. A system for managing event information, comprising:
a network computer, comprising:
a memory that stores at least instructions; and
one or more processors that execute instructions that enable performance of actions, including:
providing a plurality of events that are associated with one or more entities;
determining a plurality of state types based on the plurality of events, wherein each state type is associated with a state key, and wherein each state key is distinct from other state keys;
determining one or more state keys that are associated with each entity based on one or more events associated with each entity and the one or more state types;
providing a state stream for each entity based on their one or more state keys, wherein each state stream is an ordered sequence of the one or more state keys that are associated with each entity; and
in response to query information that includes one or more pattern filters, one or more queries and other information, performing further actions, including:
employing the one or more pattern filters to determine a portion of the one or more entities based on the state stream for each entity, wherein the one or more pattern filters match the state stream for each of the portion of the entities; and
generating one or more query results based on execution of the one or more queries on the portion of the one or more entities; and
employing the other information to provide a format and a layout for a visualization based on the one or more query results for the portion of the entities; and
a client computer, comprising:
a memory that stores at least instructions; and
one or more processors that execute instructions that enable performance of actions, including:
displaying the query result on a hardware display.

12. The system of claim 11, wherein the one or more processors of the network computer execute instructions that perform actions, further comprising:
concatenating the one or more state keys that are associated with each entity into one or more sequences of states.

13. The system of claim 11, wherein the pattern filter, further comprises, a regular expression that is arranged to match one or more sequences of state keys.

14. The system of claim 11, wherein determining the state types, further comprises:
determining one or more fields in the plurality of events that are associated with one or more state transitions associated with the one or more entities that are associated with the plurality of events.

15. The system of claim 11, wherein determining a portion of the one or more entities based on the state stream for each entity, further comprises:
comparing each sequence of state keys to the pattern filter;
determining one or more state streams based on an affirmative result of the comparison; and employing the one or more determined state streams to determine each entity that corresponds to the one or more determined state streams.

16. A network computer for managing event information, comprising:
   a memory that stores at least instructions; and
   one or more processors that execute instructions that perform actions, including:
      providing a plurality of events that are associated with one or more entities;
      determining a plurality of state types based on the plurality of events, wherein each state type is associated with a state key, and wherein each state key is distinct from other state keys;
      determining one or more state keys that are associated with each entity based on one or more events associated with each entity and the one or more state types;
      providing a state stream for each entity based on their one or more state keys, wherein each state stream is an ordered sequence of the one or more state keys that are associated with each entity; and
      in response to query information that includes one or more pattern filters, one or more queries and other information, performing further actions, including:
         employing the one or more pattern filters to determine a portion of the one or more entities based on the state stream for each entity, wherein the one or more pattern filters match the state stream for each of the portion of the entities; and
         generating one or more query results based on execution of the one or more queries on the portion of the one or more entities; and
         employing the other information to provide a format and a layout for a visualization based on the one or more query results for the portion of the entities.

17. The network computer of claim 16, wherein the one or more processors execute instructions that perform actions, further comprising:
   concatenating the one or more state keys that are associated with each entity into one or more sequences of states.

18. The network computer of claim 16, wherein the pattern filter, further comprises, a regular expression that is arranged to match one or more sequences of state keys.

19. The network computer of claim 16, wherein determining the state types, further comprises: determining one or more fields in the plurality of events that are associated with one or more state transitions associated with the one or more entities that are associated with the plurality of events.

20. The network computer of claim 16, wherein determining a portion of the one or more entities based on the state stream for each entity, further comprises:
   comparing each sequence of state keys to the pattern filter;
   determining one or more state streams based on an affirmative result of the comparison; and
   employing the one or more determined state streams to determine each entity that corresponds to the one or more determined state streams.

* * * * *